(12) United States Patent
Zigmond et al.

(10) Patent No.: US 8,881,189 B2
(45) Date of Patent: *Nov. 4, 2014

(54) INFERRING DEMOGRAPHIC COMPOSITIONS OF TELEVISION AUDIENCES

(71) Applicant: Google Inc., Mountain View, CA (US)

(72) Inventors: Daniel J. Zigmond, Menlo Park, CA (US); Diane Lambert, Berkeley Heights, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,761

(22) Filed: Apr. 12, 2013

(65) Prior Publication Data

US 2013/0227601 A1 Aug. 29, 2013

Related U.S. Application Data

(63) Continuation of application No. 13/277,827, filed on Oct. 20, 2011, now Pat. No. 8,468,559.

(60) Provisional application No. 61/422,561, filed on Dec. 13, 2010.

(51) Int. Cl.
| | | |
|---|---|---|
| *H04H 60/32* | (2008.01) | |
| *H04H 60/33* | (2008.01) | |
| *H04N 21/442* | (2011.01) | |
| *H04H 60/45* | (2008.01) | |
| *H04H 60/64* | (2008.01) | |

(52) U.S. Cl.
CPC ......... *H04N 21/44213* (2013.01); *H04H 60/33* (2013.01); *H04H 60/45* (2013.01); *H04H 60/64* (2013.01)
USPC ................... 725/14; 725/12; 725/16; 725/10

(58) Field of Classification Search
CPC .............................. H04N 21/44; H04H 60/45
USPC ...................................................... 725/12, 16
See application file for complete search history.

(56) References Cited

U.S. PATENT DOCUMENTS

| | | |
|---|---|---|
| 5,550,928 A | 8/1996 | Lu et al. |
| 7,343,417 B2 | 3/2008 | Baum |
| 7,895,626 B2 | 2/2011 | Georgis et al. |
| 8,239,886 B2 | 8/2012 | Savoor et al. |
| 8,255,949 B1 | 8/2012 | Bayer et al. |
| 2002/0059218 A1 | 5/2002 | August et al. |
| 2003/0051238 A1 | 3/2003 | Barone |
| 2006/0168623 A1 | 7/2006 | Khoo et al. |
| 2006/0293954 A1 | 12/2006 | Anderson et al. |
| 2007/0180469 A1 | 8/2007 | Finley et al. |

(Continued)

OTHER PUBLICATIONS

Anderson et al., U.S. Appl. No. 13/077,493, filed Mar. 31, 2011, 34 pages.

(Continued)

*Primary Examiner* — Mark D Featherstone
*Assistant Examiner* — Tien M Nguyen
(74) *Attorney, Agent, or Firm* — Fish & Richardson P.C.

(57) ABSTRACT

Methods, systems, and apparatus, including computer programs encoded on a computer storage medium, for inferring a demographic composition of a television audience of a television program. In one aspect, a method extrapolates television audience demographics from rated programs to unrated programs by attributing demographics of rated programs to unrated programs when the rated and unrated program are related by demographically rated channel tunes.

20 Claims, 4 Drawing Sheets (56) References Cited

U.S. PATENT DOCUMENTS

| | | |
|---|---|---|
| 2007/0288953 A1 | 12/2007 | Sheeman et al. |
| 2008/0148317 A1 | 6/2008 | Opaluch |
| 2009/0007169 A1 | 1/2009 | Headley et al. |
| 2009/0083417 A1 | 3/2009 | Hughes et al. |
| 2009/0133058 A1 | 5/2009 | Kouritzin et al. |
| 2010/0083318 A1 | 4/2010 | Weare et al. |
| 2010/0223215 A1 | 9/2010 | Karypis et al. |
| 2011/0029666 A1 | 2/2011 | Lopatecki et al. |
| 2011/0225608 A1 | 9/2011 | Lopatecki et al. |
| 2012/0110027 A1 | 5/2012 | Falcon |

OTHER PUBLICATIONS

Lambert et al., U.S. Appl. No. 13/083,663, filed Apr. 11, 2011, 34 pages.
Claritas, "PRIZM NE Segments" [online], retrieved Aug. 12, 2011, 3 pages.
Nielsen, "Television Measurement" [online], retrieved Aug. 2, 2011, 2 pages.
Rosenberg, Matt "You Are Where You Live," About.com [online], retrieved Aug. 12, 2011, 1 page.
Wikipedia.com "Claritas Prizm" [online], retrieved Aug. 12, 2011, 10 pages.
Wikipedia.com "Nielsen ratings" [online] [retrieved Aug. 12, 2011] 9 pages.

INFERRING DEMOGRAPHIC COMPOSITIONS OF TELEVISION AUDIENCES

CROSS REFERENCE TO RELATED APPLICATIONS

This application is a continuation application of, and claims priority to, U.S. patent application Ser. No. 13/277,827, entitled Inferring Demographic Compositions Of Television Audiences, which was filed on Oct. 20, 2011, which claims the benefit under 35 U.S.C. §119(e) of U.S. Application No. 61/422,561, titled "Inferring Demographic Compositions Of Television Audiences," and filed on Dec. 13, 2010. The disclosures of the foregoing applications are incorporated herein by reference in their entirety.

BACKGROUND

This disclosure relates to determining demographics of a program audience.

Advertisers often set exposure goals for advertising campaigns for advertising content, e.g., television ads, and devise strategies to achieve these goals, e.g., when to air the advertising campaign content. Accordingly, advertisers are very interested in knowing the number of viewers in program audiences and the demographics of program audiences, e.g., the percentage of male and female viewers for a given program, and the ages of the male and female viewers.

The number of viewers of a television program can be determined in a variety of ways. For example, viewing device logs, such as set top box logs that include channel tune records, can be analyzed to determine the number of set top box devices tuned to particular television programs at particular times. Behavioral algorithms can also be applied to discount view counts that are likely false, e.g., view counts that occur late at night and multiple hours after a last channel tune are discounted as it is likely that a viewer has fallen asleep. Panels or surveys can also be used to determine the number of viewers.

Demographic information is typically gathered using panels or surveys. However, it is impractical to sample enough people to determine the audience composition for every particular television program. Accordingly, while ratings information in terms of the number of viewers may be available for many television programs, the programs are nevertheless unrated with respect to demographics.

SUMMARY

In general, the subject matter of this specification relates to systems and methods for inferring a demographic composition of a television audience of a television program.

In general, one innovative aspect of the subject matter described in this specification can be embodied in methods that include the actions of accessing ratings data describing, for each of a plurality of first television programs, demographics of a viewing audience of the first television program; identifying demographically rated channel tune records, each of the demographically rated channel tune records identifying a channel tune between a broadcast of a respective first television program and a broadcast of a second television program; and estimating, from the demographically rated channel tune records, the demographics of the viewing audience of the second television program. Other embodiments of this aspect include corresponding systems, apparatus, and computer programs, configured to perform the actions of the methods, encoded on computer storage devices.

Another innovative aspect of the subject matter described in this specification can be embodied in methods that include the actions of identifying a first television program, the first television program being a television program for which the demographics of a viewing audience of the first television program is determined to be not reliably specified in ratings data; accessing ratings data describing, for each of a plurality of second television programs and third television programs, demographics of a viewing audience of each second television program and each third television program; identifying first channel tune records for viewing devices from viewing device reporting data, each first channel tune record identifying a television channel change to a first channel from a respective second channel, each television channel change being between a broadcast of a respective second television program on the respective second channel and a broadcast of the first television program on the first television channel; identifying second channel tune records for viewing devices from the viewing device reporting data, each second channel tune record identifying a television channel change from the first television channel to a respective third channel, each television channel change being between the broadcast of the first television program on the first television channel and by a broadcast of a respective third television program on a respective third channel; and estimating, from the first and second channel tune records, the demographics of the viewing audience of the first television program. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Audience demographics can be determined for demographically unrated television programs by leveraging off the demographic rating information of other television programs by an automated process, which reduces the cost associated with determining demographics of demographically unrated television programs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
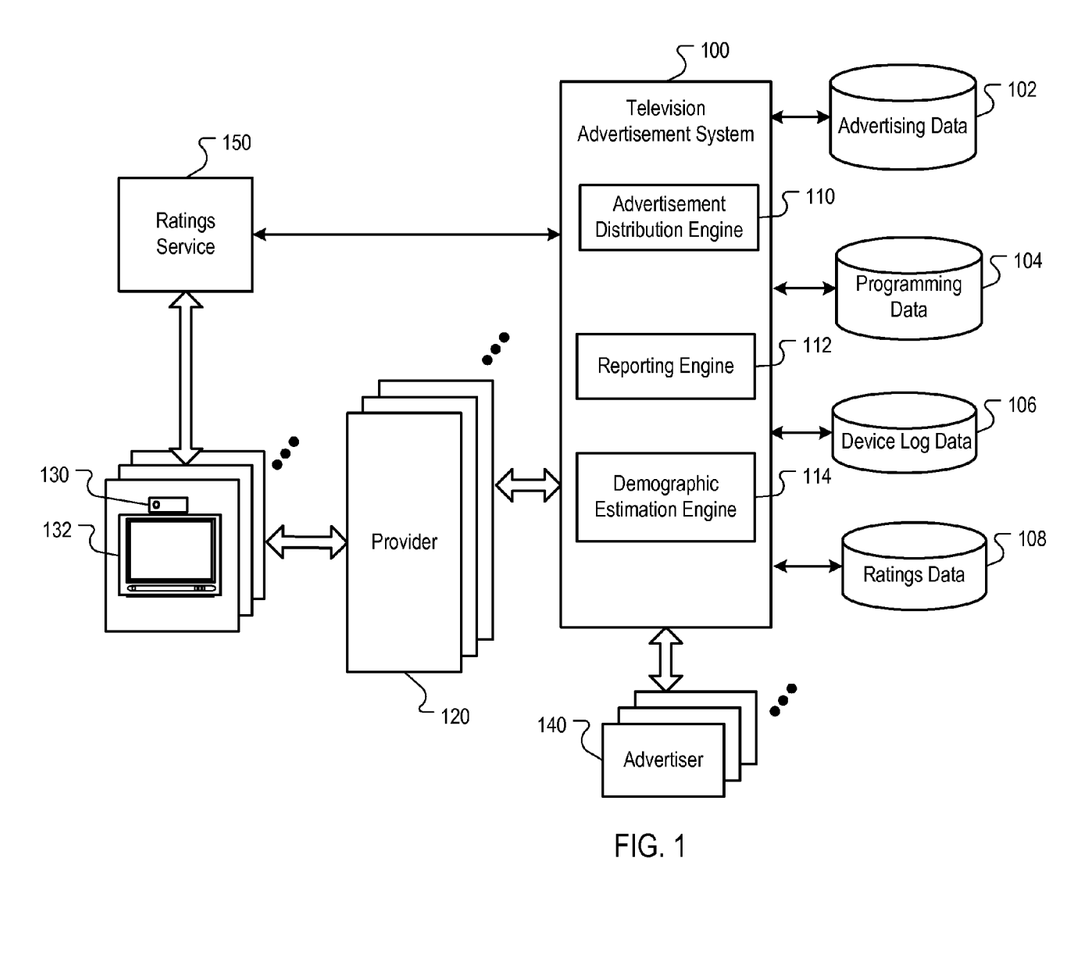
FIG. 1 is a block diagram of an example television advertisement system.

FIG. 1 is a block diagram of an example television advertisement system 100. Television advertisement system 100 delivers advertising campaign content, e.g., television ads/creatives, to an advertising population to facilitate operator monetization of programming and quantification of content delivery to target markets. The advertisement can be shown separately from a television program in the form of a television commercial, or can be shown concurrently with a television program in the form of an overlay or text stream on a portion of a television display.

The television advertisement system 100 is typically implemented in a plurality of computer servers, and can provide and receive data over a network. Example networks include local area networks (LANs), wide area networks (WANs), telephonic networks, and wireless networks. Additionally, the television advertisement system 100 can, for example, communicate over several different types of networks, e.g., the Internet, a satellite network, and a telephonic network.

In general, the television advertisement system 100 receives television advertisements and campaign data from advertisers 140. An advertiser is entity that provides television advertisements, such as a commercial entity that sells products or services, an advertising agency, or a person. The television advertisement system 100 facilitates the provisioning of television advertisements to television providers 120. A television provider is an entity that facilitates the delivery of a television broadcast (e.g., the programming of a television network) to viewers, such as cable provider, a digital satellite provider, a streaming media provider, or some other media provider.

The television advertisement system 100 can also obtain viewing information related to viewing devices 130. Example viewing devices 130 include set top boxes, digital video recorders and tuners, and other television processing devices that facilitate the viewing of the television signal on a television device. In some implementations, logs related to viewing device 130 activity, e.g., set top box logs, can be anonymized to remove personal information related to viewing activities by the television advertising system or prior to being provided to the television advertisement system 100. In some implementations, users of the set top box devices may opt out of the log collection process so that their viewing habits are not disclosed to any third party.

The viewing information can be provided by the television providers 120, or can be provided by third parties. In the example system 100 of FIG. 1, the viewing information is provided in the form of set top logs from the television providers 120.

The system 100 can also receive data from a ratings service 150. A ratings service 150 is an entity that gathers ratings information, including demographic information, from households. The ratings service 150 implements an audience measurement system to determine the audience size and composition (demographics) of television programming. Example audience measurement systems include viewer diaries, a system in which a target audience records it viewing history and provides the viewing history to the ratings service 150. Another example involves the use of set to box meters that gather the viewing history of a household and transmit the history data to the service 150 on a period basis (e.g., daily). Other audience measurement systems can also be used to generate ratings information that includes demographic data.

The television advertisement system 100 also includes one or more data stores to store set top log data, ratings data, television advertisements and associated advertisement data. In some implementations, the television advertisement system 100 includes a television advertisement data store 102, a programming data store 104, a device log data store 106, and a ratings data store 108.

The television advertisement data store 102 stores data defining television advertisements that can be broadcast or aired during an advertisement spot. Example television advertisements include video advertisements, banner advertisements, overlay advertisements, etc. The advertisement data store 102 also includes advertising campaign information for multiple advertisers. An advertising campaign describes an ad or a group of related ads, and conditions for airing the advertisement.

The programming data store 104 stores programming schedules and advertisement avails. The advertisement distribution engine 110 uses the programming schedules and advertisement avails to auction and schedule advertisements.

The device log data store 106 can include, for example, data logs/television reporting data from viewing devices 130, e.g., set top boxes, satellite receivers, etc. The log data store 106 can store reporting data that include channel identifiers, e.g., channel tune records, identifying channels for programming that was presented on televisions 132 by use of the viewing devices 130, such as may occur when the viewing device 130 is processing video data to record and/or display. The log data store 106 can also store reporting data that include device time data identifying times and/or durations at which (or with which) a viewing device was used to present the programming of the channels; and device identifiers identifying the viewing devices 130. The log data can be anonymized to protect individual users, through, for example, removal of personally identifying information, demographic aggregation of data, anonymization of user identifiers and/or device identifiers, and the like.

The ratings data 108 stores ratings data for programs. For each program, the ratings data describes the demographics of a viewing audience of the program. For many programs, the ratings data 108 are received from the ratings service. However, as described above, it is often impractical for the ratings service 150 to sample enough people to determine the audience composition for every particular television program. Accordingly, while ratings information in terms of the number of viewers may be available for many television programs, many of the programs are nevertheless unrated with respect to demographics. As will be described in more detail below, a demographic estimation engine 114 can determine a demographic composition of a television audience of an unrated television program from the demographics of one or more rated television programs.

In addition to the demographic estimation engine 114, the television advertisement system 100 also includes an advertisement distribution engine 110 and a reporting engine 112. The advertisement distribution engine 110 is configured to provide approved advertisements to the television provider 120. In some implementations, the advertisements are provided to the television provider 120 in advance of airing the advertisements. In some implementations, after receiving a request for any new advertisements to be downloaded for airing by the provider 120, the television advertisement system 100 labels the download with a particular ID that can be used later to identify the advertisement and the distribution engine 110 can deliver the advertisement to the appropriate provider 120.

The reporting engine 112 can, for example, receive advertisement reporting information from the provider 120 and determine whether the selected television advertisement aired based on the advertisement report information (an advertisement may not air due to a programming irregularity, e.g., a sporting event going beyond a scheduled broadcast, an interruption to scheduled programming due to breaking news), and generate reports from the reporting information. The reports can include impressions and demographics of the viewing audiences.

The reporting engine 112 access the advertising data 102, programming data 104, device log data 106 and the ratings data 108 and, using this information, creates associations between the device identifiers, the channel identifiers and the device time data to identify the time blocks in which each viewing device 130 was used to present programming on the channel corresponding to the time block, and the duration each viewing device was used to present the programming for the channel associated with that time block.

The reporting engine 112 determines the number of impressions for each airing of an advertisement. The impressions can, for example, be measured statistically. An impression can be a household impression, e.g., the airing of an advertisement in household and independent of the number of televisions in a household. If the advertisement is aired on a viewing device in the household, one household impression can be recorded. In other implementations, impressions can be measured by an analysis of activity logs of the viewing devices 130. For example, a household may have three viewing devices 130, and at a given time two of the devices may be tuned to a first channel and the third device may be tuned to a second channel. If a first commercial airs on the first channel and a second commercial airs on the second channel during a time that the logs for the viewing devices 130 indicated that the viewing devices are tuned to the channels, impressions can be generated for each viewing device.

§2.0 Estimating Demographics for Demographically Unrated Programs

For television programs that have been rating by the ratings service 150, the system 100 can determine ratings information from the ratings data 108 received the rating service 150. Such information can include the number of viewers in the viewing audience of the television programs, and the demographic composition of the viewing audience for each television program. However, many the television programs do not have demographic rating information available for them. This can be due to an insufficient number of viewers that watched a television program for the rating service 150 to determine a demographic composition with the required level of certainty. For example, if the rating service 150 receives information from 10,000 panelist, and only 75 panelists watched a particular television program, the sample set of 75 may be too small to extrapolate the demographic composition to a larger audience. Accordingly, for television programs for which the rating service 150 did provide demographic rating information with an acceptable level of certainty, the demographic estimation engine 114 can estimate demographic composition of a television audience for an unrated television program from tune-ins to the unrated television program from rated television programs, and from tune-outs to rated television programs from the unrated television program.

Figure 2:
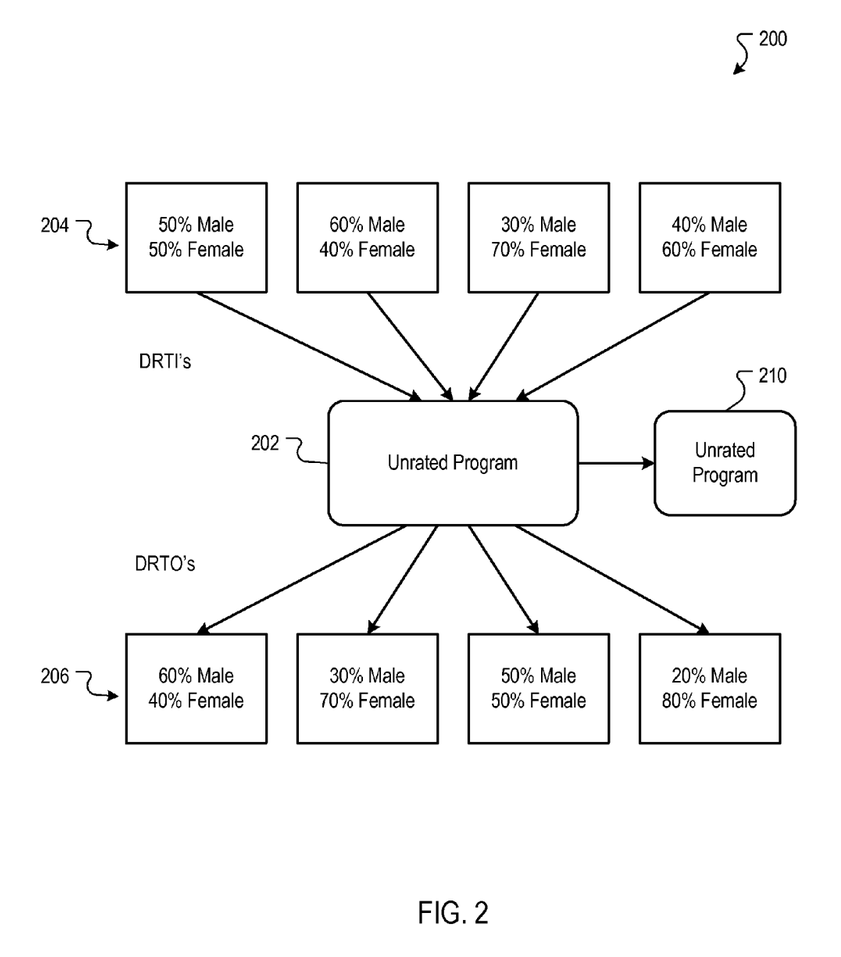
FIG. 2 is a block diagram illustrating demographically rated tune-ins to an unrated television program and demographically rated tune-outs from the unrated television program.

The process by which the demographic estimation engine 114 determines the demographic composition of television audiences for unrated programs is better understood with reference to FIG. 2, which is a block diagram illustrating demographically rated tune-ins to an unrated television program and demographically rated tune-outs from the unrated television program.

The demographic estimating engine 114 identifies television programs for which the demographics of a viewing audience are not reliably specified in ratings data 108. For example, for certain programs the ratings data 108 received from the ratings service 150 may not include demographic data, or may include demographic data that is determined to be unreliable, e.g., demographic data derived from a very small sample set. As shown in FIG. 2, for example, the demographic estimation engine 114 identifies an unrated program 202.

The demographic estimation engine 114, however, has access to demographics of viewing audiences of numerous other television programs for which demographic data are available. For example, the television programs 204 and 206 are other television programs for which demographic ratings data related to male and female viewership are available.

Once these television programs 202, 204, and 206 are identified, the demographic estimation engine 114 searches for channel tune records of viewing devices that indicate the viewing devices changed channels (and thus television programs) from the rated programs to the unrated program, or from the unrated program to rated programs. These records each capture a channel change from either a rated program 200 program, or from an unrated program to rated program, i.e., a channel change between an unrated program and a rated program. The channel change between two programs can be from the first program to the second program, or from the second program to the first program. The changing of a channel from a rated program to an unrated program is referred to as a "demographically rated tune-in," (DRTI) and the changing of the channel from an unrated program to a rated program is referred to as a "demographically rated tune-out" (DRTO). From these demographically rated channel tune records, the demographic estimation engine 114 estimates the demographics of the viewing audience of the unrated television program.

For example, with respect to FIG. 2, the demographic estimation engine 114 determines demographics of the viewing audience of the respective television program 204 from the ratings data 108, and determines the demographics of the viewing audience of the respective television program 206 from the ratings data 108. These demographics are then attributed to the unrated television program 202, and thus to each demographically rated channel tune, to estimate the demographics of the viewing audience of the first television program 202. In some implementations, the demographic estimation engine 114 aggregates the demographics attributed from each channel tune and determines averaged demographics from the aggregated demographics.

For example, the demographics of each of the television programs 204 and 206 with respect to male and female viewership are shown for each program in FIG. 2. These demographics are treated as probabilities that the viewer is either a male or female. The probabilities are aggregated and then averages of all of the incoming demographically rated tune-ins and all the outgoing demographically rated tune-outs are determined. Assuming there is only four demographically rated tune-ins and for demographically rated tune-outs a shown in FIG. 2 for the unrated program 202, the estimated demographics for the unrated programs are:

(0.5+0.6+0.3+0.4+0.6+0.3+0.5+0.2)/
8=42.5%     Estimated Male Audience (0.4+0.4+0.7+0.6+0.4+0.7+0.5+0.80)/8=57.5%   Estimated Female Audience For illustrative purposes only, only one demographically rated tune-in and one demographically rated tune-out is shown for each respective program 204 and 206. However, in practice the number of demographically rated tune-ins and demographically rated tune-outs for each rated program relative to the unrated program can number in the hundreds to the thousands. More generally, a particular demographic D is determined according to the formula:

$$D = \frac{\sum_{i=1}^{m} D_{DRTI(i)} + \sum_{k=1}^{n} D_{DRTO(k)}}{m+n}$$

where:

$D_{DRTI(i)}$ is a contribution of the particular demographic D for the $i^{th}$ demographically rated tune-in;

$D_{DRTO(k)}$ is a contribution of the particular demographic D for the $k^{th}$ demographically rated tune-out;

m is the number of demographically rated tune-ins for the particular demographic; and n is the number of demographically rated tune-outs for the particular demographic.

In some implementations, only the demographically rated tune-ins are used to estimate the audience demographics. Alternatively, in some implementations, only the demographically rated tune-outs are used to estimate the audience demographics.

Additionally, the ratings information shown in FIG. 2 for the rated programs 204 and 206 are for an entire program. In some implementations, the ratings data are divided into two or more intervals that occur during broadcast times of the television programs (e.g., 15 minute intervals). The demographic estimation engine 114 determines, for each channel tune record of each respective television program 204 and 206, a time at which the identified channel tune occurred. Using the time information, the demographic estimation engine 114 determines the demographics of the viewing audience from the ratings data of the interval within which the time occurred. Thus, for example, a particular rated television program that has multiple demographically rated channel tunes for an unrated program may contribute different demographics to the unrated program, depending on the time that the channel tune occurred. For example, assume a rated television program is a half-hour program, and the demographics in the first 15 minute interval are 50% male, and 50% female, while the demographics in the second 15 minute interval are 48% male, and 52% female. Demographically rated channel tunes occurring in the first 15 minute interval will be assigned a probability of 50% male and 50% female, while demographically rated channel tunes occurring in the second 15 minute interval will be assigned a probability of 48% male, and 52% female.

Once the demographic compositions of unrated programs are estimated, they are stored in the ratings data 108. In some implementations, the demographic estimation engine 114 cannot use estimated ratings data 108 to further estimate demographics of other unrated programs. For example, after the demographic composition is determined for the unrated program 202 and stored in the ratings data 108, a channel tune from the unrated program 202 to another unrated program 210 is not considered a demographically rated tune in. In other implementations, the channel tune from the unrated program 202 to another unrated program 210 can be considered a demographically rated channel tune after the estimated demographic data for the unrated program 202 are stored in the ratings data 108.

Figure 3:
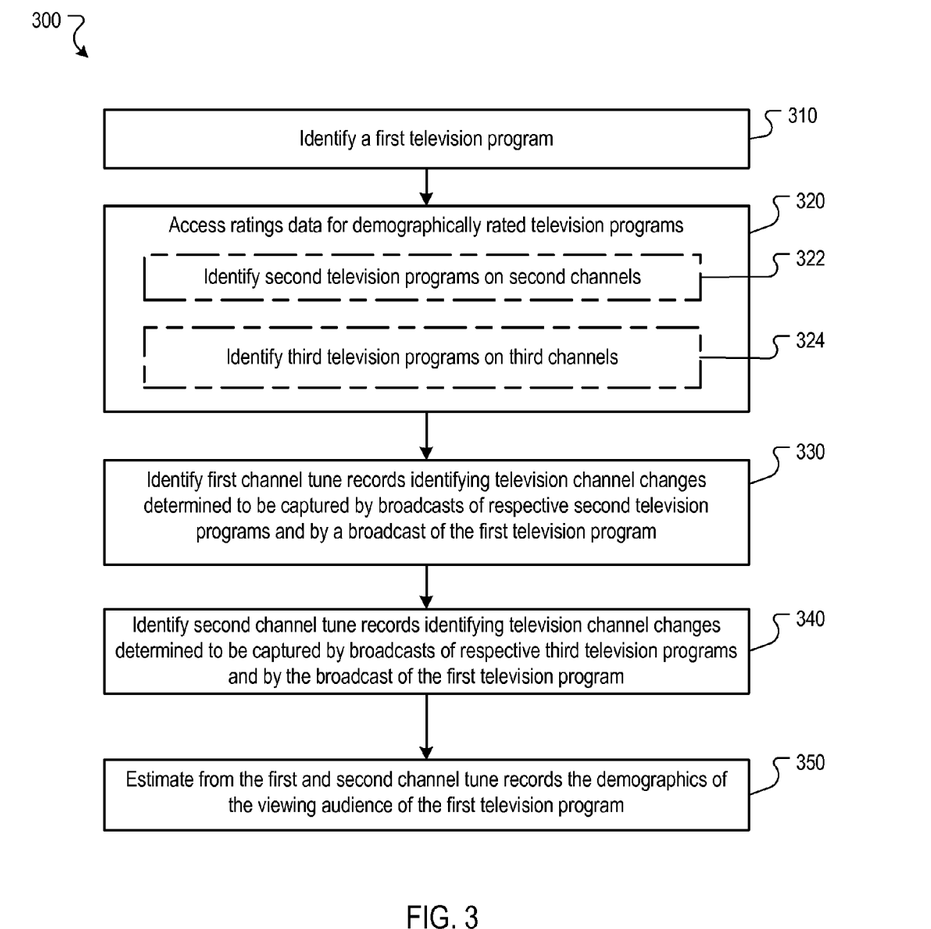
FIG. 3 is a flow diagram of an example process for determining demographics for an unrated television program.

FIG. 3 is a flow diagram of an example process 300 for determining demographics for an unrated television program. The process 300 can be implemented in the demographic estimation engine 114.

The process 300 identifies a first television program (310). The first television program is an unrated television program. For example, the demographic estimation engine 114 identifies the television program 202, which is an unrated program.

The process 300 accesses ratings data for demographically rated television programs (320). For example, the demographic estimation engine 114 accesses ratings data 108 provided by rating service 150. Using the ratings data, the process 300 identifies second television programs on second channels (322), and identifies third television programs on third channels (324). For example, the demographic estimation engine 114 identifies second television programs 204, and identifies third television programs 206, as shown in FIG. 2.

The process 300 identifies first channel tune records identifying television channel changes determined to be captured by broadcasts of respective second television programs and by a broadcast of the first television program (330). For example, the demographic estimation engine 114 identifies demographically rated channel tune records for the demographically rated tune-ins from the television programs 204 to the television program 202.

The process 300 identifies second channel tune records identifying television channel changes determined to be captured by broadcasts of respective third television programs and by a broadcast of the first television program (340). For example, the demographic estimation engine 114 identifies demographically rated channel tune records for the demographically rated tune-outs from the television program 202 to the television programs 206.

The process 300 estimates, from the first and second channel tune records, the demographics of the viewing audience of the first television program (350). For example, the demographic estimation engine 114 and estimates the demographics of the unrated program 202 from the demographically rated channel tune records identified in step 340 above.

§3.0 Filtering Demographics from Attribution

Figure 4:
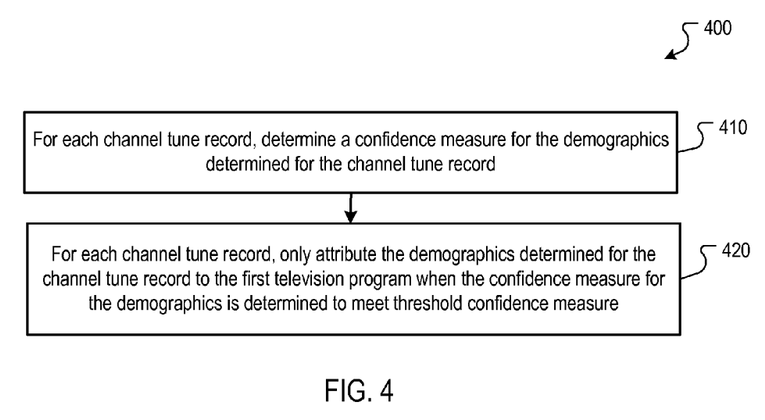
FIG. 4 is a flow diagram of an example process for determining whether to attribute demographics for a channel tune record to an unrated program.

FIG. 4 is a flow diagram of an example process 400 for determining whether to attribute demographics for a channel tune record to an unrated program. The process 400 can be performed by the demographic estimation engine 114.

There may be situations where a demographically rated channel tune record may not accurately represent an estimation of an audience member. This is because audiences may not be consistent between different programs. Accordingly, the demographics associated with any particular demographically rated channel tune record can be compared to the overall demographics of all of the demographically rated channel tune records to determine whether the demographics are similar enough to not constitute noise.

For example, a child within a household may be watching a children's television program. The children's television program has associated demographics with a very young viewing audience. An adult within the household may change the channel to another program that has, in fact, a mature demographic, for example, a financial analysis program. Assuming the children's television program is unrated with respect to demographics, the process 300 above would attribute the demographics of the financial analysis program to the children's television program.

It is very likely, however, that a large majority of demographically rated tune-ins and demographically rated tune-outs for the unrated children's television program come from rated children's television programs. Accordingly, the demographics associated with the news program are likely to be so dissimilar from the aggregate demographics of the demographically rated tune-ins and tune outs for the unrated children's television program that they can be effectively discounted. These dissimilarities can be identified based on the relative number of demographically rated channel tunes between respective programs, and/or by the similarity of the demographics of a particular channel tune record to the demographics of all other channel tune records.

For each channel tune record, the process 400 determines a confidence measure for the demographics determined from the channel tune record (410). For example, in some implementations, the demographic estimation engine 114 determines, for each respective first television program, a number of channel tune records identifying a channel tune determined to be captured by the broadcast of the respective first television program and the broadcast of the second television program. Alternatively, the demographic estimation engine 114 aggregates the demographics determined for all demographically rated channel tune records and, for each channel tune record, determines a similarity metric that measures the similarity of the demographics for the channel tune record to the demographics of the aggregated channel tune records.

For each channel tune record, the process 400 only attributes the demographics determined for the channel tune record to the first television program when the confidence measure for the demographics is determined to meet a threshold confidence measure. For example, in the implementations in which the demographic estimation engine 114 determines a number of channel tune records is a confidence measure, the threshold confidence measure is a minimum count number, and the confidence measure for the demographics of a channel tune record is determined to meet threshold confidence measure when the number of channel tune records for the respective first television program exceeds the minimum count number. Likewise, in the implementations in which the demographic estimation engine 114 determines a similarity metric, the threshold confidence measure is a minimum similarity threshold, and the confidence measure for the demographics of a channel tune record is determined to meet threshold confidence measure when the similarity metric for the channel tune record is equal to or greater than the minimum similarity threshold.

Other filtering techniques can also be used. For example, demographically rated tune-ins and tune-outs that are indicative of "channel surfing" can be filtered from attribution. Consider the case of a viewer changing from channel 45 to 57 by incrementing quickly through channels 46-54. At that time, the programming on channels 45 and 57 may have an adult demographic, while the programming on channels 51-54 may have a children's demographic. Additionally, some of the programs on the channels may be demographically rated by the ratings service 150, while others may not be demographically rated. Thus, attributing various demographics for each rated tune-in and tune-out may results in an inaccurate smearing of the demographics. Accordingly, a minimum dwell time that measure the amount of time a viewing device 130 was tuned to a particular channel can be required before the demographics of rated tune-ins and tune-outs are attributed to unrated programs. The estimation engine 114 determines the minimum dwell time from time tags present in the channel tune records.

In some implementations, the minimum dwell time can be required for both programs to which a tune-in and tune-out relates. For example, with respect to FIG. 2, for each demographically rated tune-in, each program 204 must be presented on the viewing device 130 for at least the minimum dwell time before the channel change (e.g., two minutes), and the unrated program 202 must be presentment for at least the minimum dwell time after the channel change (e.g., two minutes). If these conditions are met, then the demographics for the demographically rated tune-in can be attributed to the unrated program 202. The same filtering technique can be required for demographically related tune-outs.

This filtering process can also be used to preclude such records from being processed by the process 300 prior to the execution of the process 300.

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Figure 5:
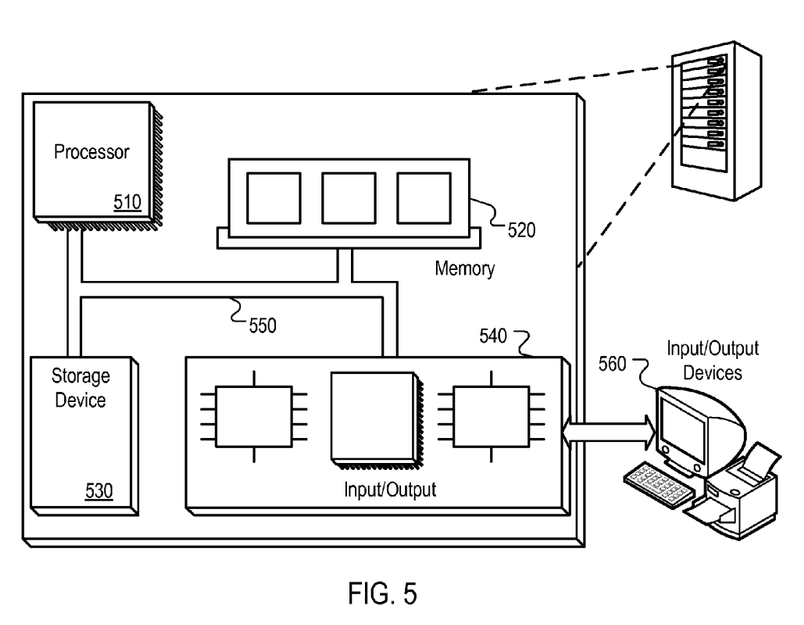
FIG. 5 is a block diagram of a programmable processing system.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server. An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530. The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device. The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus; and
software stored on a computer readable medium comprising instructions executable by the one or more processing devices and upon such execution cause the data processing apparatus to perform operations comprising:
identifying a first television program, the first television program being a television program for which the demographics of a viewing audience of the first television program is determined to be not within a particular level of certainty in ratings data;
identifying first channel tune records for viewing devices from viewing device reporting data, each first channel tune record identifying a television channel change to a broadcast of the first television program from a broadcast of a respective second television program, each respective second television program having ratings data that specifies demographics of a viewing audience of the respective second television program;
identifying second channel tune records for viewing devices from the viewing device reporting data, each second channel tune record identifying a television channel change from a broadcast of the first television program to a broadcast of a third television program, the third television program having ratings data that specifies demographics of a viewing audience of the third television program; and
estimating, from the first and second channel tune records, the demographics of the viewing audience of the first television program.

2. The system of claim 1, wherein estimating the demographics of the viewing audience of the first television program comprises:
for each first channel tune record, determining demographics of the viewing audience of the respective second television program from the ratings data for the second television program;
for each second channel tune record, determining demographics of the viewing audience of the respective third television program from the ratings data for the third television program;
attributing the demographics determined for each channel tune record to the first television program; and
estimating the demographics of the viewing audience of the first television program from the demographics attributed to the first television program.

3. The system of claim 2, wherein estimating the demographics of the viewing audience of the first television program from the demographics attributed to the first television program comprises:
aggregating the demographics attributed from each channel tune; and
determining averaged demographics from the aggregated demographics.

4. The system of claim 2, wherein the ratings data are divided into two or more intervals that occur during broadcast times of the television programs; and
wherein estimating the demographics of the viewing audience of the first television program comprises, for each first and second channel tune records:
identifying a time at which the identified channel change occurred; and
estimating the demographics of the viewing audience from the ratings data of the interval within which the time occurred.

5. The system of claim 2, wherein attributing the demographics determined for each channel tune record to the first television program comprises:
for each channel tune record, determining a confidence measure for the demographics determined for the channel tune record; and
for each channel tune record, only attributing the demographics determined for the channel tune record to the first television program when the confidence measure for the demographics is determined to meet a threshold confidence measure.

6. The system of claim 5, wherein:
the threshold confidence measure is a minimum count number; and
determining a confidence measure for the demographics determined for each channel tune record comprises:
determining, for each respective second television program identified in first channel tune records, a number of channel tune records identifying a channel tune between the broadcast of the respective second television program and the broadcast of the first television program;
determining, for each respective third television program identified in second channel tune records, a number of channel tune records identifying a channel tune between the broadcast of the respective third television program and the broadcast of the first television program; and
determining the confidence measure for the demographics determined for each channel tune record based on the number of channel tune records determined for the respective television programs.

7. The system of claim 5, wherein:
determining a confidence measure for the demographics determined for each channel tune record comprises:
aggregating the demographics determined for each channel tune record; and
for each channel tune record, determining a similarity metric that measures the similarity of the demographics for the channel tune record to the aggregated channel tune records;
the threshold confidence measure is a minimum similarity threshold; and
the confidence measure for the demographics of a channel tune record is determined to meet the threshold confidence measure when the similarity metric for the channel tune record is equal to or greater than the minimum similarity threshold.

8. A computer-implemented method performed by a data processing apparatus, the method comprising:
identifying a first television program, the first television program being a television program for which the demographics of a viewing audience of the first television program is determined to be not within a particular level of certainty in ratings data;
identifying first channel tune records for viewing devices from viewing device reporting data, each first channel tune record identifying a television channel change to a broadcast of the first television program from a broadcast of a respective second television program, each respective second television program having ratings data that specifies demographics of a viewing audience of the respective second television program;

identifying second channel tune records for viewing devices from the viewing device reporting data, each second channel tune record identifying a television channel change from a broadcast of the first television program to a broadcast of a third television program, the third television program having ratings data that specifies demographics of a viewing audience of the third television program; and estimating, from the first and second channel tune records, the demographics of the viewing audience of the first television program.

9. The method of claim 8, wherein estimating the demographics of the viewing audience of the first television program comprises:

for each first channel tune record, determining demographics of the viewing audience of the respective second television program from the ratings data for the second television program;

for each second channel tune record, determining demographics of the viewing audience of the respective third television program from the ratings data for the third television program;

attributing the demographics determined for each channel tune record to the first television program; and estimating the demographics of the viewing audience of the first television program from the demographics attributed to the first television program.

10. The method of claim 9, wherein estimating the demographics of the viewing audience of the first television program from the demographics attributed to the first television program comprises:

aggregating the demographics attributed from each channel tune; and determining averaged demographics from the aggregated demographics.

11. The method of claim 9, wherein the ratings data are divided into two or more intervals that occur during broadcast times of the television programs; and wherein estimating the demographics of the viewing audience of the first television program comprises, for each first and second channel tune records:

identifying a time at which the identified channel change occurred; and estimating the demographics of the viewing audience from the ratings data of the interval within which the time occurred.

12. The method of claim 9, wherein attributing the demographics determined for each channel tune record to the first television program comprises:

for each channel tune record, determining a confidence measure for the demographics determined for the channel tune record; and for each channel tune record, only attributing the demographics determined for the channel tune record to the first television program when the confidence measure for the demographics is determined to meet a threshold confidence measure.

13. The method of claim 12, wherein:

the threshold confidence measure is a minimum count number; and determining a confidence measure for the demographics determined for each channel tune record comprises:

determining, for each respective second television program identified in first channel tune records, a number of channel tune records identifying a channel tune between the broadcast of the respective second television program and the broadcast of the first television program;

determining, for each respective third television program identified in second channel tune records, a number of channel tune records identifying a channel tune between the broadcast of the respective third television program and the broadcast of the first television program; and determining the confidence measure for the demographics determined for each channel tune record based on the number of channel tune records determined for the respective television programs.

14. The method of claim 12, wherein:

determining a confidence measure for the demographics determined for each channel tune record comprises:

aggregating the demographics determined for each channel tune record; and for each channel tune record, determining a similarity metric that measures the similarity of the demographics for the channel tune record to the aggregated channel tune records;

the threshold confidence measure is a minimum similarity threshold; and the confidence measure for the demographics of a channel tune record is determined to meet the threshold confidence measure when the similarity metric for the channel tune record is equal to or greater than the minimum similarity threshold.

15. A computer readable storage device comprising instructions that, when executed by a data processing apparatus, cause the data processing apparatus to perform operations comprising:

identifying a first television program, the first television program being a television program for which the demographics of a viewing audience of the first television program is determined to be not within a particular level of certainty in ratings data;

identifying first channel tune records for viewing devices from viewing device reporting data, each first channel tune record identifying a television channel change to a broadcast of the first television program from a broadcast of a respective second television program, each respective second television program having ratings data that specifies demographics of a viewing audience of the respective second television program;

identifying second channel tune records for viewing devices from the viewing device reporting data, each second channel tune record identifying a television channel change from a broadcast of the first television program to a broadcast of a third television program, the third television program having ratings data that specifies demographics of a viewing audience of the third television program; and estimating, from the first and second channel tune records, the demographics of the viewing audience of the first television program.

16. The computer readable storage device of claim 15, wherein estimating the demographics of the viewing audience of the first television program comprises:

for each first channel tune record, determining demographics of the viewing audience of the respective second television program from the ratings data for the second television program;

for each second channel tune record, determining demographics of the viewing audience of the respective third television program from the ratings data for the third television program;

attributing the demographics determined for each channel tune record to the first television program; and estimating the demographics of the viewing audience of the first television program from the demographics attributed to the first television program.

17. The computer readable storage device of claim 16, wherein estimating the demographics of the viewing audience of the first television program from the demographics attributed to the first television program comprises:

aggregating the demographics attributed from each channel tune; and determining averaged demographics from the aggregated demographics.

18. The computer readable storage device of claim 16, wherein the ratings data are divided into two or more intervals that occur during broadcast times of the television programs; and wherein estimating the demographics of the viewing audience of the first television program comprises, for each first and second channel tune records:

identifying a time at which the identified channel change occurred; and estimating the demographics of the viewing audience from the ratings data of the interval within which the time occurred.

19. The computer readable storage device of claim 16, wherein attributing the demographics determined for each channel tune record to the first television program comprises:

for each channel tune record, determining a confidence measure for the demographics determined for the channel tune record; and for each channel tune record, only attributing the demographics determined for the channel tune record to the first television program when the confidence measure for the demographics is determined to meet a threshold confidence measure.

20. The computer readable storage device of claim 19, wherein:

the threshold confidence measure is a minimum count number; and determining a confidence measure for the demographics determined for each channel tune record comprises:

determining, for each respective second television program identified in first channel tune records, a number of channel tune records identifying a channel tune between the broadcast of the respective second television program and the broadcast of the first television program;

determining, for each respective third television program identified in second channel tune records, a number of channel tune records identifying a channel tune between the broadcast of the respective third television program and the broadcast of the first television program; and determining the confidence measure for the demographics determined for each channel tune record based on the number of channel tune records determined for the respective television programs.

* * * * *